3,748,161
COMBUSTIBLE WATER REPELLENT COATING
William O. Seals, Budd Lake, and Jean Picard, Morristown, N.J., assignors to the United States of America as represented by the Secretary of the Army
No Drawing. Filed Mar. 2, 1971, Ser. No. 120,354
Int. Cl. C08b 21/12, 27/22, 27/02
U.S. Cl. 106—181
10 Claims

ABSTRACT OF THE DISCLOSURE

A composition suitable for use as a repellant coating for a non-metallic combustible cartridge case and the like against the effects of water in both the liquid and vapor state. The composition represents a synergistic combination of a wax dispersed in a hydrous aluminum silicate gel and having a plasticized nitrocellulose binder. The properties of the above composition relative to abrasion and adhesion may be further enhanced with 2,4-tolylene diisocyanate and aluminum of the flake variety.

---

The invention described herein may be manufactured, used and licensed by or for the Government for governmental purposes without the payment to us of any royalty thereon.

This invention relates to a composition suitable for use in producing a combustible water repellent coating for non-metallic cartridge cases and related items such as primer tubes, igniter cartridges for mortar rounds, caseless cartridges, etc.

More particularly, this invention relates to a composition for use in producing a repellent coating on a combustible cartridge of the non-metallic variety against water in both the liquid and vapor state.

Combustible cartridge cases of the non-metallic variety have proved themselves of acceptable utility by the military. However, it has been found that storage of such cartridge cases for any appreciable length of time in an atmosphere containing a relatively high degree of moisture has affected the utility of such items for their designed purpose. For example, the penetration of moisture into such items has produced conditions which are potentially hazardous during the firing of a round such as the production in the breech and barrel of residues of a smoldering nature and even, in many cases, misfires have occurred.

In the past, there were many attempts to solve the aforesaid problems of moisture penetration of a combustible cartridge case but each had ultimately failed to overcome the hazardous difficulties inherent in the use of such items. For instance, preformed films or films that were shrinkable by heat have been bonded to the outer surface of the case in order to prevent moisture penetration. However, such films provided poor tear strength and in many cases left residues in the breech when the case was consumed on firing. Also, with the same purpose in mind, several types of films were deposited on the surface of the case by vacuum but, again, on firing in an artillery piece, a substantial amount of residue was left in both the barrel and the breech. Attempts were further made to produce a continuous film on the surface of the case by in situ polymerization utilizing infra-red light. However, the surface irregularities of the case prevented the forming of a continuous film and, as a result, poor water-vapor transmission rates were obtained. Many other techniques were utilized to prevent penetration of the case and these included the metallization of the surface of the case by means of a vacuum procedure. However this was altogether unacceptable because of failure to initially achieve acceptable transmission rates relative to water in both the liquid and vapor state. These techniques included coatings produced by spray or dip operations utilizing commercially available compositions. However, in each case either the coating initially failed to give acceptable resistance to penetration by water in both the liquid or vapor phase, or if such aim was achieved, such coating produced a substantial amount of smoldering residue in the breech or barrel of the gun upon firing and, as heretofore described, this was extremely hazardous.

What is needed is a composition for use as a coating of a combustible cartridge of the non-metallic variety which is initially resistant to the penetration of water in both the liquid and vapor state. And in addition what is ultimately needed is such a coating which is wholly, totally and completely combustible without in any way producing a residue in the chamber, breech or barrel of an artillery piece upon actual firing in the field.

The subject invention answers the needs of the art with special emphasis on a composition for use as a coating of a combustible cartridge which, in addition, does not affect the ballistic performance of the round in the field.

It is therefore an object of this invention to provide a composition for use in imparting repellency to a combustible cartridge case against water in both the liquid and vapor states.

Another object is to provide a composition of such a nature which is wholly, totally and completely combustible upon ignition in an artillery piece in the field.

A further object is to provide a composition of the aforesaid characteristics which does not in any way affect the ballistic performance of the round fabricated with the use of such combustible cartridge case.

Other objects and many of the attendant advantages of this invention will become more apparent upon a reading of the following detailed description wherein:

The subject invention broadly encompasses a synergistic combination of a wax of the water insoluble type dispersed in a hydrous aluminum silicate gel and having a plasticized nitrocellulose binder.

Waxes for use in this invention must survive service between extremes of temperature of about $-65°$ F. and $160°$ F. To be effective in this range, such waxes must be utilized with a binder because they tend to become brittle or melt at the temperatures of use in the field. Suitable waxes include natural and synthetic waxes, such as for example, beeswax and petroleum waxes, particularly those having a melting point above about $140°$ F. A wax which was found to impart an optimum degree of imperviousness to the cartridge cases relative to water in both the liquid or vapor state was a petroleum wax which possessed a melting point of about $69°$ C., a flash point of about $281-282°$ C., a density of about 0.9 and is known in the trade as Warcosine wax.

The base binder preferably utilized in this composition was nitrocellulose having a nitrogen content of about 12.6 percent. Nitrocelluloses of other nitrogen contents, e.g. 10.6, 11.5 and 13.15 are also suitable. However, nitrocellulose of 12.6 percent nitrogen content was selected as the preferred binder because of its excellent properties relative to combustion and film forming and because, on a weight per unit area basis, it exhibited the optimum in the provision of a barrier to moisture.

A plasticizer was introduced to provide the necessary flexibility to the film in order to meet the stresses encountered in the severe low temperature environments encountered in the field besides ordinary rough handling in loading. Dibutylphthalate was found to be the most effective plasticizer in the prevention of moisture penetration into the case. However, other plasticizers for nitrocellulose can also be employed with satisfactory results, such as for example tung oil, castor oil, soya bean oil, diethyl phthalate, dioctyl phthalate and chlorinated biphenyls.

In order to achieve a more uniform and continuous film, the wax was held in suspension by means of a gel. Hydrous aluminum silicate was incorporated in the composition because not only did it possess the ability to gel in the presence of an organic solvent but also because it exhibited excellent resistance to water in both the liquid and vapor state.

Highly acceptable results of a synergistic nature may be achieved when the aforesaid ingredients of the composition of this invention lie in the ranges indicated in Table I below and the composition is utilized as a coating for a combustible cartridge.

TABLE I

| Ingredients: | Percent by wt. |
|---|---|
| (a) Wax | 1–10 |
| (b) Nitrocellulose | 40–80 |
| (c) Hydrous alumimum silicate | 5–25 |
| (d) Plasticizer | 10–30 |

In the preferred embodiment, satisfactory results were achieved when the ingredients were present in the following formulation.

TABLE II

| Ingredients: | Percent by wt. |
|---|---|
| Wax (Warcosine) | 5 |
| Nitrocellulose (12.6% N) | 60 |
| Dibutylphthalate | 19 |
| Hydrous aluminum silicate (Bentone 34) | 15 |
| 2-nitrodiphenylamine | 1 |

When the above formulation was compared for its designed purpose to a similar formulation which did not possess hydrous aluminum silicate and to a third formulation which did not possess either the aforesaid silicate or wax, it was found that the composition of this invention was at least six times more effective in the protection of a cartridge case of the non-metallic variety against water vapor.

In another embodiment of this invention, the properties of the above composition relative to abrasion and adhesion could be improved by the addition of an organic isocyanate, e.g. 2,4-tolylene diisocyanate, and metallic fillers. Not only are the aforesaid physical properties improved but also, the resistance of the case to penetration by water in the liquid and vapor state is dramatically increased. For instance, the water transmission rate of the case is reduced by a factor of 6.

The 2,4-tolylene diisocyanate may be included in the preferred composition of this invention between about 1 and 20 percent by weight based on the total weight of the composition while the metallic filler may be incorporated between about 1 and 20 percent by weight in the same composition. Aluminum of the flake variety has been found to be quite effective for this purpose. The table which follows illustrates the specific formulation which was found to be most effective.

TABLE III

| Ingredients: | Percent by wt. |
|---|---|
| Wax (Warcosine) | 5 |
| Nitrocellulose (12.6% N) | 50 |
| Dibutylphthalate | 15 |
| Hydrous aluminum silicate | 10 |
| Tolylene diisocyanate | 4 |
| Aluminum flake | 15 |
| 2-nitrodiphenylamine | 1 |

When the composition of Table III was compared to the composition of Table II for their designed purpose, a tremendous improvement was further exhibited, as shown below:

COMPARISION OF COMPOSITIONS

| | Table II | Table III |
|---|---|---|
| Coating weights, gms./sq. in. | 0.065 | 0.074 |
| Water vapor, transmission, grams/24 hr./100 sq. in. | 0.10 | 0.06 |
| Water transmission, 8" static pressure of water, 0.07 gms./sq. in. coating, gm./24 hr./100 sq. in. | 1.22 | 0.024 |
| Tabor abrasion, 1,000 gm.-cycles, 0.09 gm./sq. in. coating | 300 | 3,000 |

The following is a description of a satisfactory method which was employed to prepare coating compositions illustrated in Table I:

A solution of the nitrocellulose was prepared by dissolving it in about 10 to 20 times its weight of a mixed solvent consisting of 60 parts by weight of toluene and 40 parts by weight of butyl acetate, after which the dibutyl phthalate or other plasticizer was added to the solution with agitation. Aluminum flake, if used, was then stirred into the solution.

The wax was dissolved in about 10 times its weight of toluene and the resulting solution was stirred into a slurry of the powdered hydrous aluminum silicate in about 5 to 10 times its weight of a 60/40 mixture of toluene and butyl acetate.

The wax-aluminum silicate mixture thus obtained was stirred into the aforesaid nitrocellulose-plasticizer solution, and the toluene diisocyanate, if employed, was added to the mixture thus obtained.

After thorough mixing the resulting mass, containing the wax dispersed in a hydrous aluminum silicate gel and having a nitrocellulose binder plasticized with dibutyl phthalate or other plasticizer, was thinned, if necessary, with the aforementioned solvent mixture until a consistency suitable for use in the spraying operation was obtained; e.g., 250 to 500 centipoises on a Brookfield viscometer.

In operation: The composition of this invention as heretofore described was sprayed on cartridge cases of the non-metallic variety and the latter were assembled as complete rounds, cycled for 10 days between a temperature of about 100° F. and 120° F. in an atmosphere having a relative humidity of about 95 percent. At the end of this period, the rounds were fired in an artillery piece without leaving a residue in either the chamber, breech or barrel of the gun and without in any way affecting the ballistic performance of the round.

We claim:

1. A composition suitable for use in producing a repellent coating on a combustible cartridge case of the non-metallic variety against water in both liquid and vapor state comprising a water insoluble wax dispersed in a hydrous aluminum silicate gel and a nitrocellulose binder containing a plasticizer for nitrocellulose, wherein said wax is present in an amount between about 1 and 10 percent, said nitrocellulose is present in an amount between about 40 and 80 percent, said hydrous aluminum silicate is present in an amount between 5 and 25 percent, and said plasticizer is present in an amount between about 10 and 30 percent, all said percentages being by weight based on the total weight of the composition.

2. The composition of claim 1 wherein said wax is present at about 5 percent, said nitrocellulose has a nitrogen content of 12.6 percent and is present at about 60 percent, said hydrous aluminum silicate is present at about 15 percent and said plasticizer is dibutylphthalate and is present at about 19 percent, all said percentages being by weight.

3. The composition of claim 1 wherein 2,4-tolylene diisocyanate is added in an amount between about 1 and 20 percent by weight.

4. The composition of claim 1 wherein aluminum of the flake variety is added in an amount between about 1 and 20 percent by weight.

5. The composition of claim 1 wherein said wax possesses a melting point of about 69° C., a flash-point between about 281–282° C. and a density of about 0.9.

6. The composition of claim 1 wherein said nitrocellulose has a nitrogen content of about 12.6 percent.

7. The composition of claim 1 wherein the plasticizer is dibutyl phthalate.

8. The composition of claim 3 wherein said diisocyanate is present at about 4 percent by weight.

9. The composition of claim 8 wherein aluminum flake is added in an amount of about 15 percnt by weight.

10. The composition of claim 9 wherein
   (a) said wax is present at about 5 percent,
   (b) said nitrocellulose contains 12.6 percent nitrogen and is present at about 50 percent,
   (c) said hydrous aluminum silicate is present at about 10 percent,
   (d) said plasticizer is dibutylphthalate and is present at about 15 percent,
   (e) said tolylene diisocyanate is present at about 4 percent,
   (f) said aluminum flakes are present at about 15 percent, and
   (g) 2-nitrodiphenylamine is present at about 1 percent, all percentages being by weight.

References Cited
UNITED STATES PATENTS

| | | | |
|---|---|---|---|
| 2,950,992 | 8/1960 | Brillhart | 106—195 |
| 2,261,716 | 11/1941 | Casto | 106—193 M |
| 3,472,802 | 10/1969 | Bownes | 260—13 |
| 1,917,540 | 5/1933 | Pearsall | 102—24 R |
| 2,408,189 | 9/1946 | Baker | 102—24 R |
| 2,205,428 | 6/1940 | Mitchell | 102—24 X |

THEODORE MORRIS, Primary Examiner

U.S. Cl. X.R.

106—195, 201